(12) United States Patent
Brasch et al.

(10) Patent No.: US 11,317,155 B1
(45) Date of Patent: Apr. 26, 2022

(54) VIRTUAL CHANNEL STREAMING UTILIZING VIDEO-ON-DEMAND CONTENT

(71) Applicant: Amazon Technologies, Inc., Seattle, WA (US)

(72) Inventors: Erin Matthew Brasch, Seattle, WA (US); Maureen G. Murray, Seattle, WA (US); Robin G. McKone, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 16/864,884

(22) Filed: May 1, 2020

(51) Int. Cl.
| | |
|---|---|
| *H04N 21/472* | (2011.01) |
| *H04N 21/482* | (2011.01) |
| *H04N 21/44* | (2011.01) |
| *H04N 21/845* | (2011.01) |
| *H04N 21/458* | (2011.01) |

(52) U.S. Cl.
CPC ....... *H04N 21/47202* (2013.01); *H04N 21/44* (2013.01); *H04N 21/458* (2013.01); *H04N 21/4821* (2013.01); *H04N 21/8456* (2013.01)

(58) Field of Classification Search
CPC ............. H04N 21/47202; H04N 21/44; H04N 21/458; H04N 21/4821; H04N 21/8456
See application file for complete search history.

(56) References Cited

U.S. PATENT DOCUMENTS

| | | | | |
|---|---|---|---|---|
| 2007/0299976 A1* | 12/2007 | Zafar | ................. | H04L 67/1068 709/229 |
| 2010/0175089 A1* | 7/2010 | Seo | ...................... | H04N 21/458 725/44 |
| 2011/0214154 A1* | 9/2011 | Nagano | .............. | H04N 21/4532 725/87 |
| 2016/0044356 A1* | 2/2016 | Eatedali | .......... | H04N 21/25891 725/34 |
| 2016/0337704 A1* | 11/2016 | Binder | ............... | H04N 21/4332 |

* cited by examiner

*Primary Examiner* — Ngoc K Vu
(74) *Attorney, Agent, or Firm* — Kilpatrick Townsend & Stockton LLP

(57) ABSTRACT

Techniques are disclosed for providing a virtual channel for presentation. The techniques include preparing a virtual channel for presenting a plurality of video files (e.g., video-on-demand (VOD) contents) in a particular order. The virtual channel may also be associated with a live point that indicates a portion of a particular video file of the plurality of video files that is streaming at a global clock time. The virtual channel may be provided within a virtual video stream according to the global clock time. The techniques further include receiving a request from a user device for the virtual channel at the global clock time, and then providing the virtual video stream to the user device for presentation of the particular video file at the live point of the particular video file scheduled for streaming at the global clock time.

20 Claims, 7 Drawing Sheets

US 11,317,155 B1

VIRTUAL CHANNEL STREAMING UTILIZING VIDEO-ON-DEMAND CONTENT

BACKGROUND

Techniques exist for providing video-on-demand (VOD) contents. These techniques allow users to access video contents without the constraints of a static broadcasting schedule. For example, a user device may browse through a video catalog of VOD contents (e.g., containing a list of movies, television (TV) shows, etc.). The user device may receive a selection of a particular VOD content (e.g., a movie), and then a computing system may stream the particular VOD content to the user device. However, sometimes VOD-enabling techniques may provide an overwhelming amount of choice of content for users to consider when browsing through a video catalog.

BRIEF DESCRIPTION OF THE DRAWINGS

Various embodiments in accordance with the present disclosure will be described with reference to the drawings, in which.

DETAILED DESCRIPTION

Figure 1:
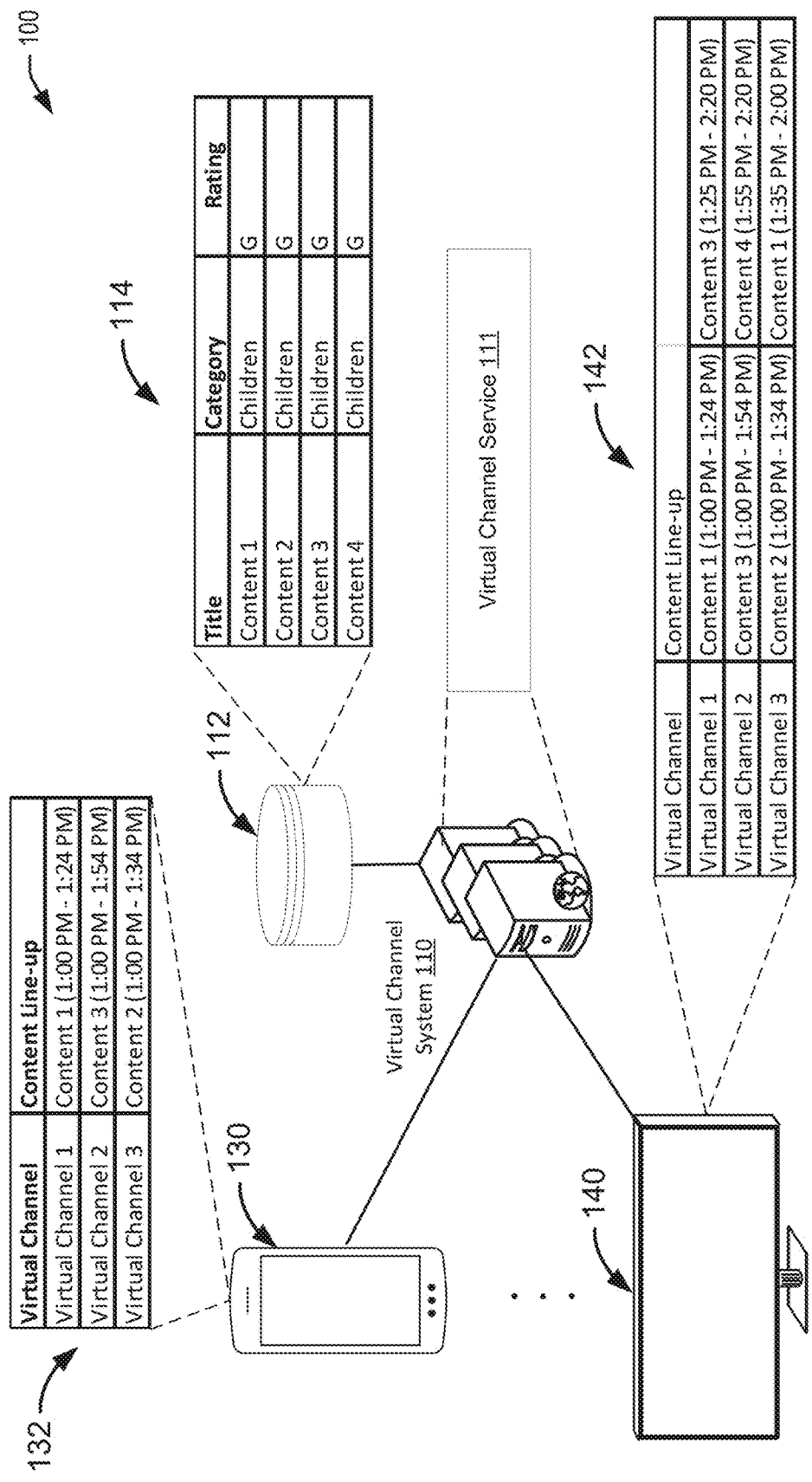
FIG. 1 is a simplified block diagram of an example system, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure may provide techniques for providing a virtual channel for presentation on a user device. For example, a user may want to watch a certain type of video content (e.g., a particular movie genre), but may not want to take the time to browse through a voluminous catalog of VOD contents to find a particular movie in that genre. In one example, a computing device (e.g., a cloud computing device) may enable a simplified browsing and viewing experience for the user by providing a virtual channel for presentation on a user device (e.g., a mobile phone) of the user. In some examples, a virtual channel may have characteristics that are similar to a conventional TV channel. For example, the virtual channel may provide video content according to a programmed streaming schedule. Upon receiving a request from a user device to view a virtual channel at a particular time, the computing device may provide (e.g., stream) the virtual channel to the user device for presenting a particular video content scheduled for streaming at the particular time. Because underlying video contents of the virtual channel may be VOD content, the computing device may also enable the user device to perform other tasks typically associated with VOD content (e.g., scrubbing forward or backward within a VOD content, skipping to a future scheduled (or previously scheduled) VOD content).

In an illustrative example, consider a scenario in which a computing device provides a virtual channel for presentation on a user device. In one example, the computing device (e.g., a computer server) may execute a virtual channel service within a cloud computing environment. The computing device may store a plurality of video files, whereby each video file may correspond to a particular video content (e.g., a movie, a TV show, a video advertisement ("ad"), etc.). At least some (e.g., all or a subset of all) of the video files may be available for viewing by VOD. The plurality of video files may, respectively, be associated with one or more attributes (e.g., category/genre, date produced, target age group, etc.). The computing device may select a subset of the plurality of stored video files based at least in part on one or more of the associated attributes. For example, the computing device may select a subset of video files (e.g., VOD contents) that have a common category attribute value (e.g., "Comedy Movies"). The computing device may then generate a virtual channel that is prepared for presenting the subset of video files according to an ordered schedule. For example, a first comedy movie may be scheduled to begin at 12:00 PM Pacific Time (PT) on a particular day and end at 1:54 PM PT, a second comedy movie may be scheduled to begin immediately following the first comedy movie (e.g., at 1:55 PM PT), and so forth. It should be understood that a virtual channel may have content scheduled for streaming substantially continuously (e.g., 24 hours a day, 7 days a week, etc.), or on any suitable schedule. The computing device may generate a plurality of virtual channels in a similar fashion (e.g., each virtual channel associated with particular attributes and/or attribute values). In some embodiments, a virtual channel may be distinguished from other virtual channels based on the composition of the video contents of the virtual channel being different than the composition of the video contents of other virtual channels (e.g., due to being selected based on different attributes and/or attribute values). In some embodiments, the virtual channel may also be distinguished from other virtual channels by the particular order of the presentation of the subset of video files that compose the virtual channel. Each virtual channel may be configured to provide a virtual video stream to one or more user devices for presentation on the respective user device(s). In one example, the virtual video stream may correspond to a substantially continuous sequence of discrete video streams that respectively correspond to video file contents (e.g., movies) of the virtual channel. In at least this way, the virtual video stream may share some characteristics of conventional broadcast TV.

Continuing with the illustration above, a user may want to watch TV at a particular time, but may not be sure what video content they want to watch. The computing device may provide to the user device (e.g., a mobile device) a channel guide for presenting the user a list of the plurality of virtual channels available for viewing. In one example, for each virtual channel, the channel guide may display a programming schedule of video contents scheduled for streaming at particular times in a continuous sequence, which may be similar to as described above. The user device may receive an input (e.g., a tap) that corresponds to a selection of a particular virtual channel of the list of virtual channels. The computing device may then receive a request from the user device that indicates that the user has selected the particular virtual channel (e.g., a "Comedy Movies" channel), whereby the request is received at a particular time (e.g., 12:34:03 PM PT).

Upon receiving a request from the user device for the particular virtual channel, the computing device may provide the virtual video stream of the virtual channel for presentation on the user device. For example, a particular comedy movie (e.g., the first comedy movie, described above) may be scheduled for streaming during a time period (e.g., from 12:00 PM PT until 1:54 PM PT that encompasses the particular time the request was received (e.g., 12:34:03 PM PT). Accordingly, a video stream corresponding to the first comedy movie may be provided to the user device for presenting the first comedy movie at a live point of the virtual channel. In some embodiments discussed herein, a "live point" of a virtual channel may indicate a portion (e.g., one or more video frames) of a particular video content (e.g., the first comedy movie) that is scheduled for streaming at a present clock time (e.g., a standardized clock time such for a particular time zone) to one or more devices that synchronize to the present clock time. Accordingly, in some embodiments, there is a single live point for a given default virtual channel (e.g., a non-personalized/non-customized virtual channel, as described further herein). In some embodiments, this present clock time may be referred to as a "global clock time" for a set of user devices (e.g., in a particular time zone). For example, a first user device in the Pacific Time Zone may request a video stream for a virtual channel at a global clock time (e.g., 12:34:03 PM PT), and a second user device, also in the Pacific Time Zone, may also request a video stream for the same virtual channel at the global clock time. The computing device may provide the virtual video stream to both devices for streaming substantially the same live point of the particular video content presently streaming within the virtual channel at the global clock time.

Continuing with the above illustration, in some embodiments, the computing device may provide the first user device the virtual video stream for presenting the first comedy movie until it ends at 1:54 PM PT. Upon the first comedy movie completing, the virtual video stream may continue by automatically transitioning to stream the second comedy move at 1:55 PM PT. In one embodiment, if the user device did not receive additional instructions (e.g., to switch to another virtual channel, or play other VOD content), the user device may continue presenting the virtual video stream (e.g., a video stream of the second comedy movie) in a seamless transition between video streams of the virtual channel. In another embodiment, while presenting the first comedy movie, the first user device may receive an input (e.g., moving a GUI-based playhead control that initially corresponds to the live point) to scrub forward or backward within the first comedy movie. In another embodiment, the first user device may receive an input to skip forward (or backwards) to the next (or previous) comedy movie in the Comedy Movies virtual channel, according to the scheduled order of movies for that channel. Upon the computing device receiving a request corresponding to one of these inputs, the computing device may provide the virtual video stream to the first user device at an updated streaming point (i.e., a different index into the virtual video stream from the live point discussed above). It should be understood that the computing system may enable random access within the virtual video stream (e.g., scrubbing forward/back within a currently playing content, skipping forward/back to another video content) based at least in part on the underlying components of the virtual video stream being originally VOD contents (e.g., different from a conventional broadcast TV channel).

It should be understood that the particular point of the virtual video stream of a virtual channel being presented at a given time may be different for different user devices. For example, as described above, the first user device and the second user device may initially present video content at the live point of the virtual channel scheduled for streaming at the global clock time. At a later time, the first user device may skip ahead to the next scheduled video content (e.g., the second comedy movie) or to a later point in the currently streaming video content, while the second user device may continue presenting the virtual video stream at the live point. In some embodiments, although the two user devices may diverge in terms of which points of the virtual live stream are being presented, the live point of the virtual live stream may remain the same with respect to the clock time (e.g., the live point will be moving with time). Accordingly, the user devices may later be synced back to the live point even though the live point will have moved in time from the actual clock time of the original or earlier live point. For example, continuing with the illustration above, after the first user device skips ahead to an updated streaming point, the first user device may later receive input to return to the live point (e.g., a screen tap of a button to "Jump to Live"). Upon receiving a request from the user device corresponding to this input, the computing device may provide the portion of the virtual video stream that corresponds to the live point. In this example, the first user device and the second device may thus be re-synced back to the same live point.

In some embodiments, virtual channels may be curated by a user. In some embodiments, the ability to curate (e.g., customize/personalize) a virtual channel may be enabled at least in part because the underlying contents of the virtual channel are VOD contents. For example, continuing with the above illustration, consider a scenario in which the user of the first user device only wants to be presented with content that is rated G (e.g., suitable for General Audiences). The first user device may receive input corresponding to an adjustment of one or more settings, which may act as a type of filter. For example, video content from the Comedy Movies virtual channel that is not rated G may be filtered out from being presented (e.g., in the schedule of movies for the Comedy Movies virtual channel listed in the Channel Guide). It should be understood that, in this example, if the first user device requests to stream the filtered virtual channel, the virtual video stream may be presented at a different live point (e.g., a customized live point) than the live point for the default (e.g., unfiltered) virtual channel. If, at a later time, the filter setting for the virtual channel was removed, the virtual video stream may be presented at the live point for the unfiltered virtual channel. It should be understood that other suitable virtual channel curations may be performed, as described further herein (e.g., creating a new virtual channel, assigning favorite channels, adjusting one or more settings for a particular virtual channel, etc.). In some embodiments, and as described further herein, one or more of the curations may be shared with another user. For example, a user device may be able to share a curated virtual channel that has a filter applied (e.g., to only show G-rated content) with another user device of another user. In another example, a user device may be presenting a virtual video stream at streaming point that is different from the live point. The user device may be able to share the location of the streaming point with another user device, so that the other user device may (if so desired) jump to the location of the current streaming point of the user device, so that the streaming points of both user devices may be synchronized. In some embodiments, any suitable sharing mechanism may be enabled to perform embodiments of the present disclosure (e.g., sharing Favorite Channels, sharing new virtual channels created by a particular user device, etc.).

For clarity of illustration, it should be understood that, although embodiments of the present disclosure are primarily directed to providing virtual channels, whereby the underlying contents of the virtual channels are VOD contents, embodiments should not be construed to be so limited. For example, a computing device of the present disclosure may generate a virtual channel that schedules a mixture of VOD contents as well a live stream of content that is recorded in real-time (e.g., a sports game being broadcast live in real-time). For example, a "Sports Channel" may schedule a first pre-recorded sports game that is a VOD content, followed by a second sports game that is broadcast live, and then a third pre-recorded sports game that is also a VOD content. It should also be understood that, as discussed herein, a VOD content may correspond to any suitable video file that is able to be streamed (e.g., a commercial ad, a movie, a TV show episode, a news broadcast, etc.). Also, although as described herein, VOD may typically be enabled in a streaming context, embodiments should not be construed to be so limited. For example, a user device may select and download a particular video for later viewing.

The embodiments of the present disclosure provide several technical advantages over existing systems. In one example, embodiments of the present disclosure may provide video streaming to a user device that combines the benefits of VOD and stream-based video (e.g., similar to a conventional TV broadcast stream). For example, as described above, by providing a selection of content that is "on now" via stream-based virtual channels, the present disclosure may enable user experience that simplifies the browsing and viewing experience by artificially limiting choice for the user. For example, the user does not need to spend time browsing through a voluminous catalog to find a selection of their liking. Additionally, embodiments of the present disclosure may provide a more coherent grouping of video content within virtual channels (e.g., utilizing attribute-based virtual channel generation). The grouping of virtual content within a virtual channel may be further customized by a user (e.g., filtering out undesirable (non-G rated) content) based in part on the underlying contents of the channel being VOD contents. Furthermore, as described above, because underlying contents of the virtual channel may be VOD contents, the computing device may also enable a user to perform other tasks typically associated with VOD content (e.g., scrubbing forward or backward, skipping into the future or the past). Also, the computing device may also retain other existing benefits of VOD. For example, a user who knows what specific content they want to watch may select a specific VOD content for viewing. In another example, because the underlying contents of a virtual channel may be VOD contents, a user device may be able to buffer content that is scheduled for later streaming (e.g., buffering by a few seconds, a few minutes, etc.). In this example, the buffering of VOD content may enable additional video stream resiliency for providing a high-quality content to the user device without periodic interruptions (e.g., due to network outages, bandwidth interruptions, etc.). This may contrast with conventional TV broadcast streams, whereby, if the stream suffers a temporary outage, and then later resumes streaming, the user may miss a portion of video content that was dropped from the stream due to the outage. By combining the benefits of VOD and stream-based video within a virtual channel context, embodiments of the present disclosure may reduce the amount of network bandwidth and/or processing resources required. For example, instead of a computing device needing to process requests from a user device to browse content until a desired content is selected, the computing device may provide a virtual channel for one or more user devices (which may be curated according to respective users' preferences). When considering the amount of saved resources over a large number of user devices (e.g., reduced browse requests from each user device), the amount of saved resources may be substantial.

FIG. 1 is a simplified block diagram 100 of an example system that provides a virtual channel to one or more user devices, according to some embodiments. In FIG. 1, the example system includes a virtual channel system 110 (e.g., which may include one or more computing devices (e.g., computer servers)), a storage device 112, a video catalog 114, and one or more user devices, represented by user device 130 and user device 140. Each user device may be configured to display various types of video-related content. For example, as depicted in FIG. 1, user device 130 may display a channel guide 132, and user device 140 may display a channel guide 142.

Turning to the components of FIG. 1 in further detail, in some embodiments, the virtual channel system 110 may be a component of a cloud computing system, whereby the cloud computing system is configured to provide (e.g., stream) video contents to one or more user devices. The virtual channel system 110 may include and/or be communicatively connected to the storage device 112, which may a store (e.g., maintain) a plurality of video files in a video store. Each video file may correspond to a container for a particular video content. Some non-limiting examples of video file formats may be MPEG-4 Part 14 ("MP4"), Quick-Time ("MOV"), Audio Video Interleave ("AVI"), etc. Some non-limiting examples of video contents may include movies, TV shows, video advertisements, documentaries, home videos, etc. In some embodiments, the virtual channel system 110 may update the plurality of video files using any suitable cadence and/or technique. For example, the storage device 112 may receive new video files that respectively correspond to recently released video content (e.g., a newly released movie, a recently broadcast sporting event, a newly uploaded home video, etc.). In another example, the virtual channel system 110 may archive video files that are no longer deemed to be suitable for providing to customers.

In some embodiments, the plurality of video files of the video store may be indexed by the video catalog 114 (e.g., in a database), which may be maintained by the virtual channel system 110. The video catalog 114, which is simplified for illustration in FIG. 1, may include a listing of each video content (e.g., by video title, or other suitable identifier), and associate each video content with one or more attributes. For example, as depicted in FIG. 1, the video titles correspond to "Content 1," "Content 2", etc. Some non-limiting examples of attributes include video categories (e.g., genres), content types (e.g., movie, TV show, etc.), language, rating (e.g., General Audiences ("G"), Parental Guidance ("PG"), Restricted ("R")), release date (e.g., 1970s, 1980s, etc.), etc. Non-limiting examples of video categories may include Comedy, Drama, Documentary, Kids, Romance, etc. It should be understood that there may sub-attributes for particular attributes of certain contents. For example, a "Kids" category may be further subdivided by age group (e.g., 0-3, 3-10, 10-17, etc.). In some embodiments, the particular attributes for a video file may be pre-determined and included within a manifest file (or other suitable source file) that is received by the virtual channel system 110 along with the video file. In some embodiments, the virtual channel system 110 may automatically determine one or more of the attributes for a video file, for example, utilizing a machine learning algorithm to analyze video content. It should be understood that any suitable number of titles and/or attributes (e.g., category, rating, etc.) of the video catalog 114 may be suitable for performing embodiments of the present disclosure.

Turning to the user devices in further detail, a user device may be any computing device that is suitable for presenting video-related content on a display. Some non-limiting examples of user devices may be include mobile phones (e.g., user device 130), smart TV's (e.g., user device 140), tablet devices, laptops, personal computers (PCs), a smart digital media player (e.g., configured to provide streaming media to a TV), or other computing devices capable of presenting video content on a display. It should be understood that video-related content may be displayed differently on user devices, depending at least in part on the type of user device. For example, as discussed further herein, a channel guide may include a list of virtual channels that may be displayed on a user device. In one embodiment, where the user device is a mobile phone (e.g., user device 130), the channel guide 132 may be displayed as a vertical list of channels that may be scrolled down on the mobile phone. In this example, the display of user device 130 may enable displaying an additional single column of the channel guide 132 that corresponds to video contents for each virtual channel that are currently being streamed. In another embodiment, where the user device is a smart TV (e.g., user device 140) that offers a larger display, the user device may display the channel guide 142 as a vertical list of channels, as well as displaying a horizontally scrollable channel line-up to the right of each virtual channel listed (e.g., which may display multiple video contents per channel, including video contents queued for future streaming). It should be understood that, although channel guide 132 and channel guide 142 may be displayed differently on different devices, the underlying data contents of each channel guide may be the same, and may be presented on a user device via any suitable mechanism. In another example, the resolution of a particular video streamed to a user device may depend in part on the type of the user device. Any suitable presentation of video-related content (e.g., a channel guide, VOD content, virtual channels, etc.) and or graphical user interface (GUI) elements (e.g., input buttons, menu icons, etc.) may be used to perform embodiments of the present disclosure.

In some embodiments, the virtual channel system 110 may execute a virtual channel service 111. In some embodiments, the virtual channel service 111 may provide one or more virtual channels for presentation on one or more user devices. In some embodiments, the virtual channel service 111 may also perform one or more other functions. For example, as described further below, in some embodiments, the virtual channel service 111 may also enable individual VOD content delivery. It should be understood that, as described herein, individual VOD content delivery (e.g., streaming) of a video file (e.g., via a request for a particular content selection) may be different than a virtual video stream of a virtual channel (e.g., via a request for a virtual channel of the channel guide), at least because the virtual video stream "stitches" (e.g., joins) together a plurality of VOD contents into a single continuous virtual video stream according to a particular order (e.g., a schedule). Accordingly, while a VOD content delivery may enable a single viewing of a requested content, a virtual channel may enable automatic continuous viewing of VOD contents according to the predetermined schedule. In another difference, and as described herein, the virtual video stream may be associated with a live point of the virtual channel that is streaming according a particular global clock time (e.g., so that multiple users may watch the same live point in the same virtual channel), whereas the individual VOD content delivery may not be associated with such live point.

Turning to the virtual channel service 111 of the virtual channel system 110 in further detail, the virtual channel service 111 may generate one or more virtual channels based at least in part on the plurality of video files indexed by the video catalog 114. For example, the virtual channel service 111 may analyze video contents of the video catalog 114 to determine a common category (e.g., a "Children" category, indicating that the video contents are intended for a child audience). The virtual channel service 111 may then select a subset (e.g., a second plurality of video files) of the plurality of video files, whereby the subset is associated with the common category. The virtual channel service 111 may then generate a virtual channel that is prepared for presenting the subset of the plurality of video files in a particular order. For example, the virtual channel may be associated with (e.g., include) a schedule profile that defines time periods during which each of the video contents of the subset of the plurality of video files is scheduled for streaming. For example, Virtual Channel 1 may include a schedule profile that indicates that Content 1 (e.g., of video catalog 114)) will be streamed between 1:00 PM and 1:24 PM (e.g., PT). Following the streaming of Content 1, Content 3 will be streamed from 1:25 PM until 2:20 PM, and then another video content may be streamed after Content 3 finishes. It should be understood that the schedule profile may define scheduling for video content of a virtual channel for any suitable time range (e.g., 1 day, 2 days, 1 week, 1 month, etc.). The schedule profile may be updated according to any suitable cadence, and/or as new video contents may be added to the video store. As described above, the continuous sequencing of video streams, respectively, for individual VOD contents over the time periods of the schedule may correspond to a virtual video stream for the virtual channel. In another example, Virtual Channel 2 may include a schedule profile that indicates that Content 3 will be streamed from 1:00 PM until 1:54 PM, followed by Content 4, from 1:55 PM until 2:20 PM, etc. In yet another example, Virtual Channel 3 may include a schedule profile that indicates that Content 2 will be streamed from 1:00 PM until 1:34 PM, followed by Content 1, from 1:35 PM until 2:00 PM, etc. Note that in each of these examples (i.e., Virtual Channels 1, 2, and 3), the same video content may be scheduled for streaming on more than one channel. However, the video content may be scheduled for streaming at different times (i.e., a different particular order), depending on the channel. For example, as depicted in FIG. 1, Content 1 may be scheduled to begin streaming on Virtual Channel 1 at 1:00 PM, while Content 1 may be scheduled to begin streaming at Virtual Channel 3 at 1:35 PM. As noted above, in some embodiments, the composition of video contents included in a virtual channel may also differentiate one virtual channel from another.

As discussed further herein, in some embodiments, when generating a virtual channel, the virtual channel service 111 may include within a virtual video stream of the virtual channel any suitable types and/or number of interstitial video content. In some embodiments, the interstitial video content may be used for any suitable purpose, including, for example, aligning the streaming schedule according to a certain cadence (e.g., predetermined cadence). In some embodiments, the cadence may be defined according to a global clock time (e.g., Pacific Time). For example, continuing with the illustration above, FIG. 1 depicts that Virtual Channel 1 immediately begins streaming Content 3 at 1:25 PM (e.g., 1:25:00 PM PT) upon the completion of Content 1 at 1:24 (e.g., 1:24:59 PM PT). In another embodiment, instead of beginning to stream Content 3 immediately following the streaming of Content 2, an interstitial content (e.g., one or more video advertisements) may be inserted in between the two video streams. In this example, the virtual channel service 111 may determine that Content 3 should begin at 1:30 PM, for example, to provide users with a channel schedule (e.g., a cadence) that is easier to remember (e.g., video programs either begin every hour, or half hour). Accordingly, the virtual channel service 111 may insert substantially 5 minutes of interstitial content between the two video streams. It should be understood that the interstitial video content may inserted at any suitable points within the virtual video stream (e.g., between video streams of different video contents, having multiple insertions within a single video content, adjacent to at least one video stream, etc.). Continuing with this example, the Content 3 may then start at 1:30 PM and finish at 2:25 PM (or 2:30 PM, allowing for other interstitial video content insertions). Similar scheduling alignments may be performed by the virtual channel service 111 in regards to the other virtual video streams, for example, so that the schedule profiles of all the virtual channels are aligned according to a consistent cadence, measured by a global clock time. In some embodiments, the interstitial video content may correspond to any suitable type of video content. Some non-limiting examples may include a video advertisement, a video from a video library of a user device, a short video clip, etc. In a particular example involving a short video clip (e.g., including a scene with children clapping), the video clip may be inserted as interstitial content one or more times within a particular VOD content (e.g., a TV episode for a Kids channel), for example, to encourage more user interaction with the video content.

In some embodiments, upon generating a virtual channel, the virtual channel service 111 may provide the virtual channel within a virtual video stream to a user device. For example, the virtual channel service 111 may first generate a virtual channel guide (e.g., channel guide 132, 142) that includes a listing of virtual channels available for selection by a user device. In some embodiments, as described above, the virtual channel guide may be presented based at least in part on the type of the user device (e.g., according to the display type of the user device), and/or other user device settings. In some embodiments, while the presentation of a channel guide on a display of a user device may vary (e.g., between user device 130 and 140), the virtual channels available for selection within the guide may be similar (e.g., the same) across different user devices. In some embodiments, as described further herein, a default channel guide of virtual channels may be provided to each user device, and then subsequently may be customized by a particular user device for a customized presentation on that device. For example, a user may set a preference for a particular virtual channel (e.g., filtering a particular type of content from being scheduled). In another example, a user device may receive input to generate another virtual channel that is specific for the particular user device, which may be reflected in a customized channel guide provided to that user device.

In some embodiments, upon providing the virtual channel guide to one or more user devices, the virtual channel service 111 may then receive a request from user device (e.g., user device 130) for a virtual channel (e.g., Virtual Channel 1) via a selection from the virtual channel guide, and then provide the corresponding virtual channel to the user device for presentation on the user device. In some embodiments, along with providing the channel guide to user devices, the virtual channel service 111 may execute a network service that is configured to listen for and receive requests from a user device over a network, and then provide a virtual video stream to the requesting user device that corresponds to the selected virtual channel. In some embodiments, the network service may utilize any suitable network protocol for communicating with the user device(s) to provide the virtual video stream corresponding to the virtual channel (e.g., Real-time Streaming Protocol (RTSP), Real-time Transport Protocol (RTP), Real-time Transport Control Protocol (RTCP), etc.).

In some embodiments, the virtual channel service 111 may provide the corresponding virtual channel at a live point of the particular video content that is presently streaming for the virtual channel. As described above, the live point may indicate a portion of the particular video content that is currently streaming according to a global time clock (e.g., Pacific Time, Eastern Time, etc.). For example, using FIG. 1 for illustration, suppose that user device 140 received input (e.g., a remote control button selection) that corresponds to a selection of Virtual Channel 2 at a present time of 1:31:04 PM PT (e.g., the global clock time). In this example, upon receiving the request, the virtual channel service 111 may provide the virtual video stream to the user device 140 by streaming the portion of Content 3 (i.e., the live point) that is currently scheduled for streaming at that present time. Continuing with this example, consider a case where user device 130 receives an input (e.g., via a screen tap) that corresponds to a selection of Virtual Channel 2 at the same time as user device 140 (e.g., 1:31:04 PM PT). In this example, user device 130 may be provide substantially the same content at that time. In another example, where the user device 130 receives the selection of Virtual Channel 2 at a later present time (e.g., 1:35:00 PM PT, or any other suitable global clock time), the virtual channel service 111 would provide the same streaming video content to both user device 130 and user device 140 (and any other device streaming Virtual Channel 2 at that later present global clock time). In at least this way, the virtual channel service 111 may have similar characteristics as conventional stream-based video (e.g., conventional TV broadcast channels), so that all user devices "tuning in" at a particular time may view the same content being streamed for that virtual channel.

In some embodiments, as described above, in addition to providing virtual channels to user devices as virtual video streams, the virtual channel service 111 may further provide VOD content (e.g., as independent video streams) to a user device. For example, consider a scenario in which the virtual channel service 111 may receive a request from a user device (e.g., user device 130) for a particular video content. For example, a user may already know what content they want to view. In this example, the user may browse through the video catalog 114 and select the particular video content (e.g., Content 4) of the video catalog 114 (e.g., that is available for VOD streaming). Upon receiving a request for the particular video content from the user device 130, the virtual channel service 111 may provide the content for presentation on the user device. For example, upon receiving the request that corresponds to the selection, the virtual channel system 110 may retrieve the video file from the storage device 112 that corresponds to the particular video content, and then provide a video stream of the video content to the user device 130 for presentation on the display of the user device 130. In this example, the video stream may end upon the completion of the particular video content. In another example, discussed further herein, because the underlying contents of a virtual video stream may be VOD contents, the virtual channel service 111 may enable the user device to skip ahead (or backward) to future (or previous) video contents, while still presenting the VOD content in virtual video stream (e.g., automatically transitioning to the next content in the virtual video stream upon the completion of the content currently being presented). In at least this way, embodiments of the present disclosure enable a system that combines the benefits of VOD and stream-based video.

Figure 2:
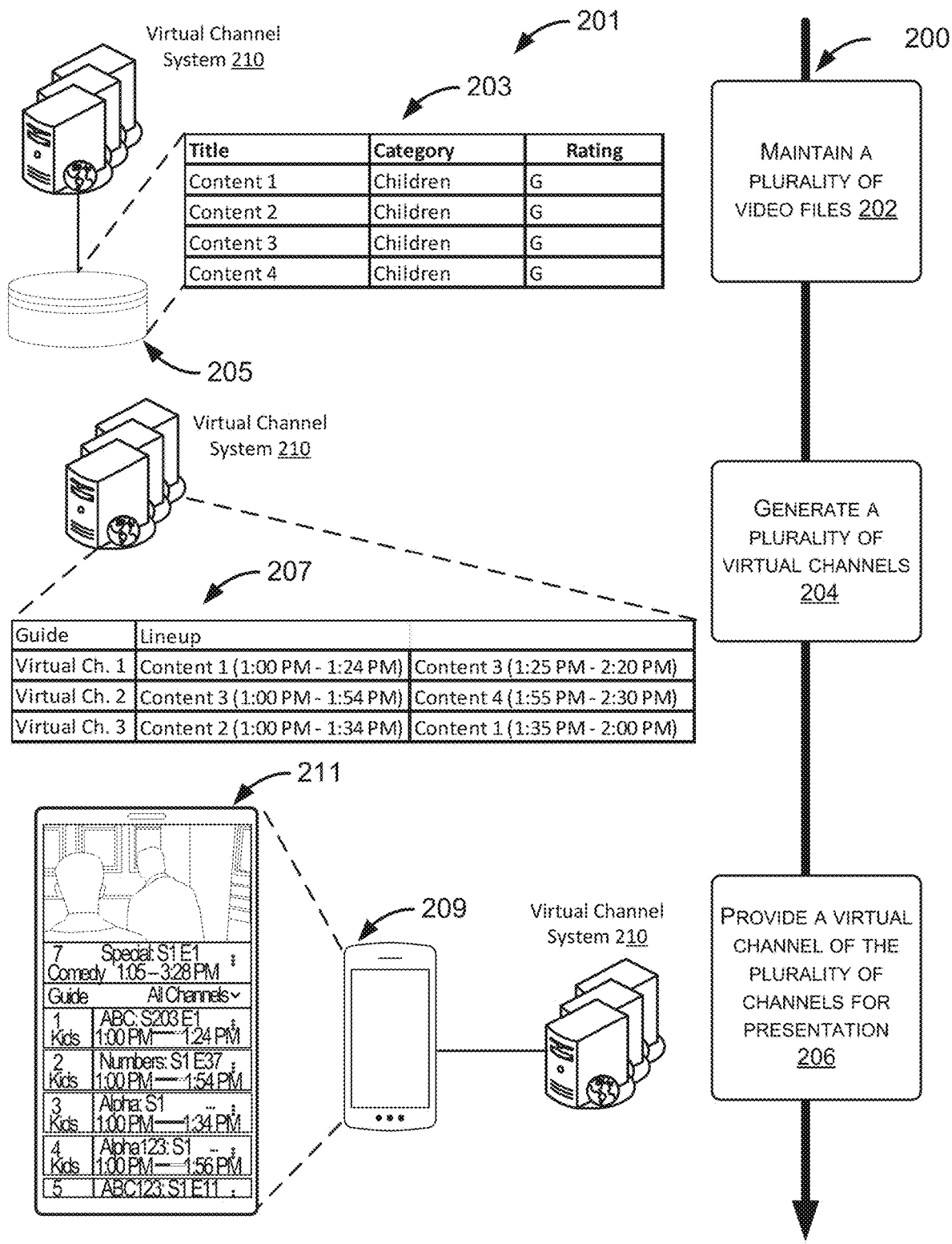
FIG. 2 is another simplified block diagram illustrating at least some example techniques for providing a virtual channel for presentation, according to some embodiments.

FIG. 2 is another simplified block diagram illustrating at least some example techniques for providing a virtual channel for presentation, according to some embodiments. The process 200 is an example high level process for a virtual channel system 210 (e.g., virtual channel system 110 of FIG. 1) providing a virtual channel to a user device for presentation on the user device. The virtual channel system 210 may execute a virtual channel service (e.g., similar to virtual channel service 111) that may perform one or more of the operations of process 200. The diagram 201 depicts example states that correspond to blocks of the process 200. The diagram 201 may include elements that are similar to those depicted in FIG. 1. For example, a virtual channel system 210 may be similar to the virtual channel system 110 of FIG. 1, a storage device 205 may be similar to storage device 112, a video catalog 203 may be similar to the video catalog 114, and a user device 209 (e.g., a mobile phone) may be similar to user device 130. A channel guide 207 is also depicted, which may be presented via a GUI presentation (e.g., GUI 211), as described further below (e.g., also as depicted in reference to the respective GUI presentations of channel guide 132 and 142 of FIG. 1).

Turning to the process 200 in further detail, at block 202, the system may maintain a plurality of video files. For example, using diagram 201 for illustration, the virtual channel system 210 may receive a plurality of video files from one or more content providers (e.g., movie production studios, individual content producers, advertisers, etc.). Each video file may correspond to a particular video content (e.g., a movie, a TV show episode, an advertisement). The virtual channel system 210 may store (and maintain) the plurality of video contents to the storage device 205 (e.g., a file server). In some embodiments, new files may be received by the virtual channel system 210 on any suitable cadence, and subsequently stored on the storage device 205. In some embodiments, each of the video files may be associated with one or more attributes (e.g., a category/genre), a year produced, a target age range, rating, etc.). As illustrated in FIG. 2, an example category may be (e.g., "Children"), and an example rating may be G. In some embodiments, these attributes may be received (e.g., via a manifest file) by the virtual channel system 210 and stored in the video catalog 203. The video catalog may correspond to a database (or other suitable data structure) for indexing each video of the plurality of video files and the respective attributes associated with each file. In some embodiments, the virtual channel system 210 may provide at least some of the video files for VOD streaming. For example, as discussed further herein, the virtual channel system 210 may receive a request from a user device (e.g., user device 209) for a specific video content (e.g., Content 1), and then provide Content 1 via VOD streaming to the user device 209.

At block 204, the virtual channel system 210 may generate a plurality of virtual channels (e.g., Virtual Channel 1, 2, 3, etc.), as depicted in the channel guide 207. In some embodiments a particular virtual channel may be determined (e.g., defined) based at least in part on the particular composition of video contents that are included as well as the ordering (e.g., schedule) for streaming the video contents relative to each other. For example, continuing with diagram 201 for illustration, the virtual channel system 210 may select a second plurality of video files that corresponds to a subset of the plurality of video files from block 202. In some embodiments, the virtual channel system 210 may select this subset based at least in part on each file of the subset having a common attribute (e.g., genre="Children"). In this example, the subset may include Content 1, 3, etc., and may be included in the lineup for a Virtual Channel 1. In some embodiments, each file of the subset may be selected based in part on having more than one attribute in common (e.g., genre="Children," target_age="0-3," rating="G"). In some embodiments, the subset may be selected based on a particular association (e.g., a correlation) between attributes and/or video contents. In one example, the virtual channel system 210 may determine that Content 1 and 2 contain scenes about science fiction, while Content 3 and 4 contain scenes about world history. The virtual channel system 210 may determine that, although the scenes relate to different subject matter, they should be included together in the same subset because children who like one type of content (e.g., science fiction) are more likely to enjoy another type (e.g., world history).

Continuing with the example of generating Virtual Channel 1, the virtual channel system 210 may further determine an ordering for Virtual Channel 1 content (e.g., Content 1, followed by Content 3, etc.). The virtual channel system 210 may determine this ordering based on any suitable factors. For example, the virtual channel system 210 may determine that Content 1 and Content 3 belong to the same TV show series, and that Content 1 precedes Content 3 in that series. In another example, the system may determine that a half-hour (or approximate thereof) episode of content should stream at 1:00 PM, while a full hour (or approximate thereof) episode should stream from 1:30-2:30. Accordingly, the virtual channel system 210 may slot Content 1 for 1:00 PM and Content 3 for 1:30 PM (potentially with interstitial video advertisements inserted within each content). In yet another example, the virtual channel system 210 may determine the ordering of video contents for streaming based at least in part on determining a regular cadence for presenting a particular type of content. For example, Content 1 may be an episode associated with a particular TV series, while Content N may be another episode associated with the same TV series. In this example, the virtual channel system 210 may determine to show the particular TV series during the 1:00 PM-1:30 PM time slot. Accordingly, Content 1 may be slotted for 1:00 PM on a first day, and Content N may be slotted for 1:00 PM on the next day, etc.

In some embodiments, the virtual channel system 210 may generate the other virtual channels (e.g., Virtual Channel 2, 3, etc.) using a similar method as described above, in reference to Virtual Channel 1. Although certain examples were described above in reference to generating a virtual channel, it should be understood that embodiments of the present disclosure may determine both the contents of a virtual channel and the schedule for streaming contents in any suitable way. As an example, and as described further herein, the virtual channel system 210 may enable the user device 209 to provide one or more inputs for generating a virtual channel (e.g., providing a "channel seed", which may correspond to a particular genre of user interest).

In some embodiments, upon generating the plurality of virtual channels, the virtual channel system 210 may also generate a channel guide (e.g., channel guide 207). The channel guide may be stored in any suitable data structure (e.g., a database), and may be regularly updated as new content is added to the schedule for each virtual channel. In some embodiments, the channel guide 207 may contain a list of virtual channels. In some embodiments, the channel guide 207 may further contain a listing of the line-up of video contents scheduled for streaming, per virtual channel. In some embodiments, and as described further herein, the channel guide 207 may be customized (e.g., configured) based at least in part on one or more settings associated with a user profile (e.g., storing one or more virtual channels as a "Favorite" channel, filtering content from being displayed in a lineup for a particular virtual channel, or otherwise personalizing a virtual channel). In some embodiments, the virtual channel system 210 may generate an updated channel guide based on the one or more customizations performed.

In some embodiments, as described herein, for each virtual channel generated, the virtual channel system 210 may provide the virtual channel within a virtual video stream. In some embodiments, providing the virtual channel may include the virtual channel system 210 listening for network requests for a particular virtual video stream (e.g., via scanning for network traffic on a particular network port, and/or utilizing a particular network protocol (e.g., RTSP)). Meanwhile, a live point may be associated with the virtual video stream and managed by the virtual channel system 210. In some embodiments, the live point may indicate a portion of a particular video content (e.g., one or more video frames) that is scheduled for streaming at a present time (e.g., a global clock time). As time passes, the virtual channel system 210 may update the live point such that, upon eventually receiving a request on the network for the particular virtual channel at the global clock time, the virtual channel system 210 may provide a video stream corresponding to the updated live point (e.g., an advanced live point) of the video content that is presently scheduled for streaming, as described further below.

At block 206, the virtual channel system 210 may provide a virtual channel of the plurality of channels for presentation on user device 209. For example, continuing with the illustration of diagram 201, the virtual channel system 210 may first receive a request for a channel guide (e.g., channel guide 207). The virtual channel system 210 may then provide the channel guide to the user device 209 for presentation on the user device 209. In some embodiments, as described herein, the channel guide 207 may be presented in any suitable GUI, depending at least in part on the type of user device (e.g., a mobile phone, a smart TV). For example, as depicted in GUI 211 and described earlier, in some embodiments, the channel guide 207 may be presented on the user device 209 whereby the list of virtual channels is presented For example, "Channel 1—Kids" may correspond to Virtual Channel 1 from channel guide 207, "Channel 2—Kids" may correspond to Virtual Channel 2, etc. A listing of the video content currently presenting may also be presented, for each virtual channel. For example, in reference to Channel 1—Kids," "ABC: S203 E1" may correspond to Content 1 of channel guide 207, which may be Episode 1 of Season 203 of a TV series titled "ABC." In another example that references Channel 2—Kids," "Numbers: S1 E37" may correspond to Content 3 of channel guide 207, which may be Episode 37 of Season 1 of a TV series titled "Numbers."

In some embodiments, after providing the channel guide 207 to the user device for presentation, the user device 209 may receive an input (e.g., a tap) that corresponds to a selection of a particular virtual channel (e.g., Virtual Channel 7). The virtual channel system 210 may then receive, from the user device 209, a request for the particular virtual channel at a particular time (e.g., the global clock time). Upon receiving the request for the particular virtual channel, the virtual channel system 210 may provide to the user device 209 the virtual video stream for presentation of the particular video file at the live point of the particular video file scheduled for streaming at the global clock time. Upon receiving the virtual video stream (e.g., the video stream for the particular video file), the user device 209 may present the video content in the GUI 211 (e.g., in the upper portion of the user device 209 display, as depicted in FIG. 2). As depicted in FIG. 2, in some embodiments, the user device 209 may still display a portion of the channel guide 207 for display, even while a virtual channel is presenting a live stream at a live point. In this way, the user may efficiently flip through virtual channels to determine they see something "on now" that they want to watch.

In some embodiments, the channel guide 207 may also be associated with a page that allows a user to browse directly for VOD content, as described herein. For example, in an event where the user knows what video content they want to watch and/or wants to take the time to search for a particular content, the user may navigate from the channel guide 207 to the associated page to find the video content for VOD streaming (e.g., separate from a virtual video stream of a virtual channel).

As described above, in some embodiments, the presentation of channel guide content, video content in the GUI 211 may be customizable and/or enable dynamic interaction with a user. For example, in some embodiments, user device 209 may receive input corresponding to a selection of a "More Information" button associated with a particular virtual channel listed in the channel guide. Upon receiving this input, the virtual channel system 210 may provide an information page about the particular channel and/or current video content streaming (e.g., a synopsis of the series and/or TV episode). In some embodiments, any suitable information may be presented in relation to the channel guide. Some other non-limiting examples may include the video content titles for a particular channel, the respective start and end times of each video content, the last date that a particular content was streamed, the duration of each content, the next date and/or time that the content is scheduled for streaming, the live point of a particular video content being streamed (e.g., via a progress bar or playhead control indicator), etc. In some embodiments, a "Settings" (e.g., customization) button may be associated with a particular virtual channel. Upon receiving input corresponding to a selection of the Settings button, the user may be presented with options for curating the particular virtual channel. For example, the user device 209 may receive input corresponding to an instruction to filter out a particular type of content (e.g., content that is not rated G) from being included in the line-up of video content for the channel. It should be understood that any suitable type of mechanism may be utilized to customize (e.g., personalize) the virtual channel. For example, a filter may be applied based on the occurrence of one or more attributes that match certain values. In another example, a particular filter (e.g., show only G rated content) may be applied across multiple (e.g., all) virtual channels. In another example of personalizing the presentation of channel guide content, the GUI 211 may receive input that corresponds to adding (or removing) one or more virtual channels to a list of "Favorite Channels." In some embodiments, the virtual channel system 210 may enabled the user to filter out non-Favorite channels from being presented in the Channel Guide. In another example of enabling dynamic interaction with the user, the GUI 211 may enable a user to browse through the full line-up of video content for a particular virtual channel that is scheduled. If the user finds a content that they want to watch now (e.g., instead of waiting for the live point of the virtual channel to be streaming that content), they may select the content for immediate viewing. It should be understood that, because the underlying contents of the virtual channel may be VOD contents, the virtual channel system 210 may enable the user to "jump ahead" and immediately stream the content as VOD, rather than waiting (if they so desire).

Figure 3:
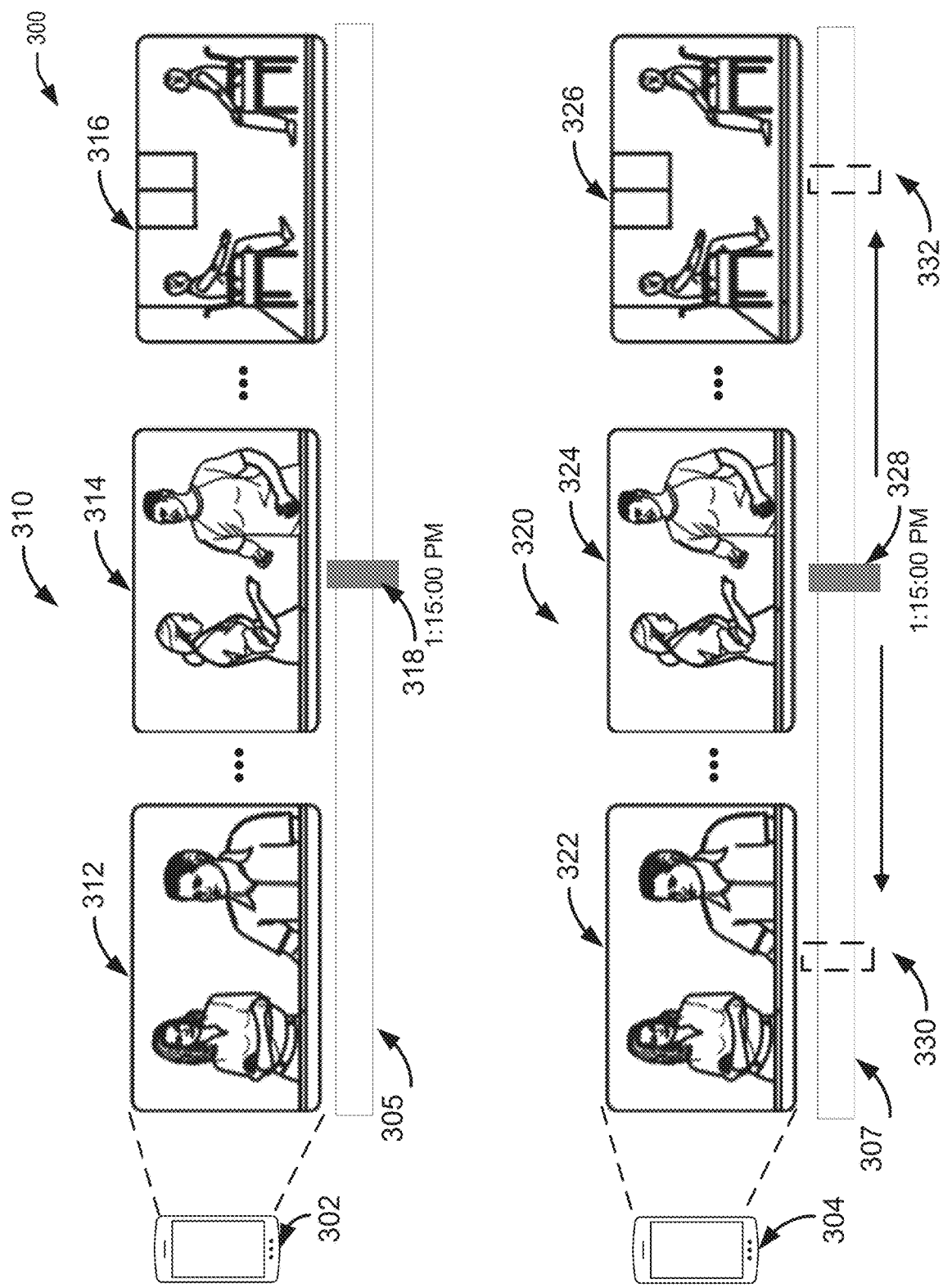
FIG. 3 is another simplified block diagram illustrating at least some example techniques for providing a virtual channel for presentation, according to some embodiments.

FIG. 3 is another simplified block diagram 300 illustrating at least some example techniques for providing a virtual channel for presentation, according to some embodiments. In FIG. 3, two user devices are depicted (i.e., user device 302 and 304). In some embodiments, each user device may be a mobile phone or any other suitable user device, as described herein. In some embodiments, both user devices 302 and 304 operate according to the same standardized clock time (e.g., Pacific Time, Central Time, Eastern Time, etc.), which is referred to herein as the global clock time. The global clock time may represent the present time in a particular standardized zone (e.g., Pacific Zone, etc.). In one scenario, and as depicted in FIG. 3, the global clock time may be 1:15:00 PM PT ("1:15 PM").

Also depicted in diagram 300 is a first sequence of video frames 310 of a virtual video stream of a particular virtual channel (e.g., Virtual Channel 1 of FIG. 1 and/or FIG. 2). For example, in one embodiment, video portions 312, 314, and 316 respectively represent time-sequenced segments (e.g., one or more video frames per segment) of a single video content (e.g., Content 1) of Virtual Channel 1. Also, a second sequence of video frames 320 is depicted, which also corresponds to a virtual video stream of the same Virtual Channel 1. For example, video portions 322, 324, and 326, respectively, represent the same time-sequenced segments of Virtual Channel 1 as depicted in the first sequence of video frames 310 (i.e., portion 312 is the same as portion 322, portion 314 is the same as portion 324, and portion 316 is the same as portion 326).

As described herein, the Virtual Channel 1 may be associated with a live point that indicates a portion of the virtual channel that is scheduled for streaming at the global clock time. For example, as depicted in diagram 300, the live point of Virtual Channel 1 corresponds to portion 314 (i.e., the same as portion 324), which is scheduled for streaming at 1:15 PM (i.e., the present global clock time).

Turning to the operations depicted in diagram 300 in further detail, at a first time (e.g., the global clock time that is presently 1:15 PM), a virtual channel service (e.g., virtual channel service 111 of FIG. 1 and/or virtual channel system 210 of FIG. 2) may be configured to provide a virtual channel stream corresponding to Virtual Channel 1 for presentation on a user device. For example, the virtual channel system may receive a request from user device 302 at the global clock time. Upon receiving the request, the virtual channel system may provide a virtual video stream to the user device 302 for presentation of a particular portion (i.e., the live point) of Content 1 (i.e., portion 314) scheduled for streaming at the global clock time. Similarly, the virtual channel system may also receive a request from user device 304 at the global clock time, and subsequently provide a virtual video stream to the user device 304 for presenting the same particular portion (portion 324) of Content 1 that is scheduled for streaming at the global clock time. It should be understood that, although as described above, both user device 302 and 304 are depicted as requesting Virtual Channel 1 at the same time and then subsequently presenting the same video content, embodiments should not be construed to be so limited. For example, suppose that user device 302 first begins streaming at a live point (e.g., portion 314) of Virtual Channel 1 at 1:15 PM (i.e., the global clock time). Then, a minute later (e.g., 1:16 PM, the updated global clock time), user device 304 begins streaming Virtual Channel 1 at an updated live point. In this example, at 1:16 PM, both devices would be still be presenting Virtual Channel 1 at substantially the same updated live point, according to the updated global clock time of 1:16 PM (assuming that user device 302 continued streaming Virtual Channel 1).

In some embodiments, the current portion of a virtual channel that is streaming may be indicated by a GUI element (e.g., a playhead control, or other suitable navigation control). The playhead may positioned relative to a progress bar, which may be used to indicate the current portion of the virtual channel that is being streamed. For example, using diagram 300 for illustration, a progress bar 305 may be visually displayed within a GUI of user device 302 (e.g., near the bottom of the screen). In one embodiment, the progress bar 305 may be positioned below the video content currently streaming. A playhead control 318 (or "playhead") may be positioned (e.g., overlaid) somewhere relative to the progress bar 305 to indicate the current video portion being streamed. Using the example described above, the virtual video stream may be provided by the virtual channel system for presentation at the live point (i.e., portion 314) at the global clock time of 1:15 PM. Accordingly, the playhead 318 may correspond to the live point being streamed. As live point advances over time, the playhead may be automatically advanced accordingly. A similar progress bar 307 may also be displayed within a GUI of user device 304. Also, a playhead 328 may be displayed in the GUI in a similar initial position as playhead 318, corresponding to the same live point of the virtual video stream being presented on user device 304 at the global clock time.

In some embodiments, as described herein, because the underlying contents of the virtual video stream may be VOD content, a virtual channel system may enable a user device to scrub forward/back within a video content and/or skip to a future or previous video content. For example, continuing with the example above, after initially streaming the virtual channel at the live point indicated by playhead 328, the user device 304 may receive an input by the user to move the playhead 328 to another location on the progress bar 307. For example, the user may move (e.g., scrub) the playhead 328 to a new location 332, which may correspond to video portion 326. In another example, instead of scrubbing forward, the user may scrub backwards to location 330, which may correspond to video portion 326. In either example, upon scrubbing forward or backward, the virtual channel system may stream video content starting from the new portion that corresponds to the adjusted playhead. It should be understood that even though the adjusted playhead may reflect an updated streaming location for the virtual channel being displayed on user device 304, the live point for a given virtual channel may remain the same (i.e., the video content scheduled to be streamed at the global clock time). For example, assuming that user device 302 has not adjusted the playhead 318, the virtual channel may continue to be presented on user device 302 at the live point according to the global clock time.

As illustrated in diagram 300, portions 322 and 326 may correspond to portions of the same VOD content (e.g., Content 1 of Virtual Channel 1). However, as described above, in some embodiments, the portions 322 and 326 may correspond to portions from another VOD contents of the virtual channel. In this example, upon the playhead 328 being skipped forward to location 332, a new portion of another VOD content (e.g., Content 3) of Virtual Channel 1 may be streaming. In another example, upon the playhead 328 skipping back to location 330, a portion of another VOD content of Virtual Channel 1 may be streaming.

It should be understood that embodiments of the present disclosure combine benefits of VOD and stream-based video by utilizing a virtual channel, as described herein. For example, by utilizing a live point for a virtual channel that indicates content that is "on now," embodiments may artificially simplify (e.g., limit) choice and create a sense of urgency. In another example, a virtual channel may also group video contents into coherent groupings (e.g., by genre), which may be similar to a stream-based model. At the same time, the virtual channel may also preserve random access (e.g., scrubbing and/or skipping back and forth) by utilizing VOD contents as the underlying sources for the virtual video stream. The virtual channel can also be modified dynamically (e.g., filtering VOD contents according to a certain parameter (e.g., only show G-rated content). In some embodiments, a "Jump to Live" button may also be available for selection on a user device GUI. In one example, utilizing diagram 300 for illustration, after the user device 304 skips to a new VOD content to stream at location 332, the user may later decide to return back to whatever content is streaming at the live point. Accordingly, upon the user device 304 receiving a selection to "Jump to Live" and transmitting a request to the virtual channel system, the virtual channel system may then provide the virtual video stream at the live point according to the global clock time. As described above, the virtual channel may also enable video stream buffering, whereby a user device (e.g., user device 304) may buffer a predetermined amount of VOD content of the virtual video stream (e.g., a sequence of video frames corresponding to a particular time interval). This buffered content may enable additional resiliency in case the virtual video stream has a bandwidth limitation (e.g., an interruption), or other network issues.

In some embodiments, as described above, a user device may be enabled to share data related to a virtual channel viewing experience with another one or more user devices. Using diagram 300 for illustration, consider a scenario where user device 304 jumps forward to location 332 (e.g., a new VOD content, or a new location with the currently streaming VOD content). The user device 304 may further receive an instruction to share the location 332 with user device 302. Upon receiving data corresponding to the location 332, the user device 302 may provide a notification that user device 304 is streaming at another location that is not the live point, and may provide an option for syncing to location 332. Upon user device 302 receiving input (e.g., a tap of a button) to sync to location 332, the playhead 318 on user device 302 may move forward on progress bar 305 to match location 332 on progress bar 307, and the virtual channel system may then provide the virtual video stream to user device 302 at the synchronized location. It should be understood that other scenarios for sharing between user devices may be enabled by embodiments of the present disclosure. In one non-limiting example, user device 304 may be notified if user device 302 has applied a new filter to the virtual channel. In another non-limiting example, user device 304 may be notified if user device 302 has created a new virtual channel, and, in one embodiment, may receive an updated channel guide that includes the new virtual channel. It should be understood that a user device be configured to receive input that indicates what types of information may be shared with other user devices and/or the virtual channel system.

Figure 4:
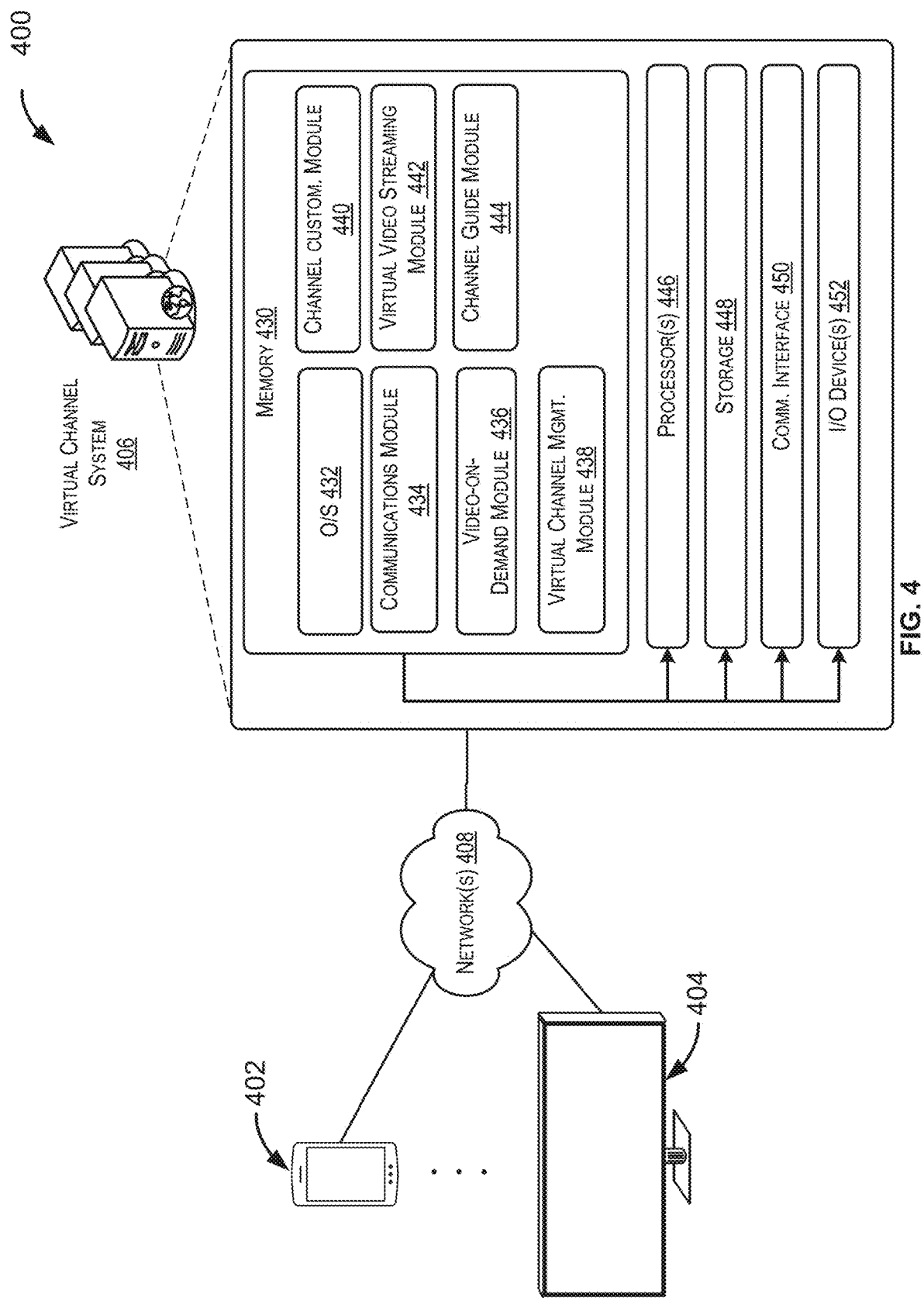
FIG. 4 is another simplified block diagram illustrating an example architecture of a system used to provide a virtual channel for presentation, according to some embodiments.

FIG. 4 is another simplified block diagram illustrating an example architecture of a system used to provide a virtual channel for presentation on a user device, according to some embodiments. The diagram 400 includes a user device 402 (e.g., similar to user device 130 of FIG. 1), a user device 404 (e.g., similar to user device 404), a virtual channel system 406 (e.g., similar to any of the virtual channel systems described herein), and a network 408.

Although user device 402 and user device 404 are, respectively, depicted in FIG. 4 as a mobile phone and a smart TV, it should be understood that any suitable computing device that is capable of presenting video content on a display may be used to perform embodiments of the present disclosure. In some non-limiting examples, a user device may be a tablet device, a smart-digital media player (e.g., configured to provide streaming media to a TV), etc.

The network 408 may include any suitable communication path or channel such as, for instance, a wire or cable, fiber optics, a telephone line, a cellular link, a radio frequency (RF) link, a WAN or LAN network, the Internet, or any other suitable medium. The network 408 may include any one or a combination of many different types of networks, such as cable networks, the Internet, wireless networks, cellular networks, and other private and/or public networks.

Turning to each element of virtual channel system 406 in further detail, the virtual channel system 406 has at least one memory 430, one or more processing units (or processor(s)) 446, a storage unit 448, a communications interface 450, and an input/output (I/O) device(s) 452.

The processor(s) 446 may be implemented as appropriate in hardware, computer-executable instructions, firmware or combinations thereof. Computer-executable instruction or firmware implementations of the processor(s) 514 may include computer-executable or machine executable instructions written in any suitable programming language to perform the various functions described herein.

The memory 430 may store program instructions that are loadable and executable on the processor(s) 446, as well as data generated during the execution of these programs. The memory 430 may be volatile (such as random access memory (RAM)) and/or non-volatile (such as read-only memory (ROM), flash memory, etc.). In some implementations, the memory 430 may include multiple different types of memory, such as static random access memory (SRAM), dynamic random access memory (DRAM) or ROM. The virtual channel system 406 may also include additional storage 448, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 448 may be similar to storage device 112 of FIG. 1, and may be used to store video files (e.g., used for providing VOD content), a database that indexes a catalog of the video files, one or more channel guides, or any other suitable data.

The virtual channel system 406 may also contain the communications interface 450 that allow the virtual channel system 406 to communicate with a stored database, another computing device or server, user terminals, and/or other devices on the network(s) 408. In some embodiments, the communications interface 450 may include one or more ports that are used to receive requests for a virtual channel guide, a virtual channel, and/or direct VOD content, and provide the requested content to the requesting device. In some embodiments, the virtual channel system 406 may also include I/O device(s) 452, such as for enabling connection with a keyboard, a mouse, a pen, a voice input device, a touch input device, a display, speakers, a printer, etc.

Turning to the contents of the memory 430 in more detail, the memory 430 may include an operating system 432 and one or more application programs or services for implementing the features disclosed herein, including a communications module 434, a video-on-demand (VOD) module 436, a virtual channel management module 438, a channel customization module 440, a virtual video streaming module 442, and a channel guide module 444. In some embodiments, one or more application programs or services of memory 430 may be included as part of a virtual channel service (e.g., virtual channel service 111 of FIG. 1).

The communications module 434 may comprise code that causes the processor 446 to generate messages, forward messages, reformat messages, and/or otherwise communicate with other entities. For example, the communications module 434 may receive requests from one or more user devices to provide video content. In one example, the request may correspond to a request to stream VOD content for a particular content selection (e.g., a particular movie). In another example the request may be for a virtual video stream of a virtual channel. In this example, the communications module 434 may provide the virtual video stream to the requesting user device, for example, by providing the video stream of whatever content is scheduled for being presently streamed according to the global clock time. In some embodiments, the communications module 434 may receive and/or transmit other data. In some non-limiting examples, the communications module 434 may receive a request for additional information about a particular video content (e.g., a synopsis of a movie), a full schedule of video contents for a particular virtual channel, etc.

The video-on-demand (VOD) module 436 may comprise code that causes the processor 446 to provide VOD content to a user device for presentation. In some embodiments, the VOD module 436 may receive requests for VOD content from a user device. In one example, the VOD module 436 may provide catalog information to a user device suitable for presenting a browse interface on the user device that enables a user to select an individual VOD content from the catalog (e.g., video catalog 114 of FIG. 1). Upon receiving a message corresponding to the selection, the VOD module 436 may provide the VOD content via a video stream to the user device. In another example, the user device may present a virtual channel guide in a GUI, similar to as described herein. The user may browse through a line-up of video contents scheduled, and may discover a particular video content that they want to watch as a stand-alone content. The virtual channel guide GUI may enable the user to select the particular VOD content, upon which the VOD module 436 may provide the particular VOD content for standalone streaming (e.g., separate from a virtual video stream).

The virtual channel management module 438 may comprise code that causes the processor 446 to generate and/or maintain one or more virtual channels. In some embodiments, the virtual channel management module 438 may maintain, for each virtual channel, a sequential ordering of video contents (e.g., in a database) scheduled for virtual video streaming according to a global clock time, as described herein. Accordingly, the virtual channel management module 438 may determine, for any given global clock time (e.g., the present time), the live point of the virtual channel at the global clock time (e.g., the particular portion (e.g., segment) of video content to be streamed). In some embodiments, the virtual channel management module 438 may determine the selection and/or ordering of video contents based on a suitable criteria, as described herein. For example, the virtual channel management module 438 may determine to stream a new episode of the same TV series each day from 1:00 PM-1:30 PM. Accordingly, the virtual channel management module 438 may schedule other video contents so that this cadence for streaming the particular TV series may be achieved. In some embodiments, as described herein, the virtual channel management module 438 may determine to insert interstitial contents (e.g., video advertisements), for example, to enable scheduling on a particular cadence. As described herein, in some embodiments, a virtual channel may include VOD contents, live-streaming contents, and/or any suitable combination. For example, a first VOD content may be schedule at a first time slot of a particular virtual channel. Then, following that time slot a live stream of a sports broadcast may be presented, followed by another VOD content. In this example, it should be understood that the live stream content may not be skipped forward (although the user may be able to skip to the next (or previous) scheduled VOD content).

The channel customization module 440 may comprise code that causes the processor 446 to customize one or more virtual channels for a user device. In some embodiments, a customization may correspond to setting a data field that indicates that a particular virtual channel is a "Favorite" channel. In some embodiments, by marking a channel (e.g., via the channel guide or other settings page) as a "Favorite" channel (or other suitable classification), the channel guide that is provided for presentation to a user device may group "Favorite" channels together (e.g., at the top of the channel guide, for easier access). In some embodiments, a customization may correspond to a particular filter that is applied to one or more virtual channels. For example, as described herein, a user device may receive input (e.g., via a settings page) to only show G-rated content for one or more virtual channels. In this case, upon applying the customization, the virtual channel system may adjust the listing of video contents that are displayed in the channel guide for the one or more virtual channels. For example, some non-G-rated contents may be removed (e.g., hidden) from the line-up. It should be understood that this type of customization may affect the ordering of video contents displayed for the customized channel. In this case, a customized live point be associated with the customized channel, whereby the customized live point indicates the particular portion of video content that is scheduled for streaming at the global clock time. It should be understood that a global live point may still be managed (e.g., alongside the customized live point for the customized virtual channel for that particular user device). The global live point, as discussed herein, may correspond to the portion of video content that is scheduled for streaming for the non-customized (e.g., default) virtual channel. Accordingly, in one embodiment, if a user resets a channel to the default settings (e.g., removing a filter), the updated live point for the reset channel will be the default (global) live point, which may be common with other user devices that have not customized the virtual channel.

In some embodiments, a channel customization may correspond to generating a new virtual channel for the user. For example, consider a scenario in which a user device receives input corresponding to a type of content that the user wants to view (e.g., movies that have won certain awards, movies from the 1980s, etc.). Based on this input, the channel customization module 440 may generate a new virtual channel for that particular user device. The new virtual channel may include a line-up of video contents are associated with the requested type of video content. In some embodiments, this new virtual channel may be displayed within the channel guide alongside other virtual channels that are provided by default. In some embodiments, the new virtual channel may be associated with a live point, similar to as described herein in regards to other default virtual channels (e.g., determined by the system 406). It should be understood that any suitable input may be utilized to generate a new virtual channel. In some embodiments, the channel customization module 440 may also enable sharing data related to a virtual channel viewing experience with one or more other user devices. For example, as described herein, the channel customization module 440 may enable user device 402 to share a current streaming location for a virtual channel (that is not the live point) with user device 404. In another example, user device 402 may be able to share a newly created virtual channel with user device 404. Any suitable virtual channel-related data may be shared between user devices and/or the virtual channel system.

The virtual video streaming module 442 may comprise code that causes the processor 446 to stream video contents of a virtual channel to a user device. In some embodiments, this module may perform similar functions as the VOD module 536, for example streaming VOD content to the user device. However, the virtual video streaming module 442 may also be response for "stitching" together contents (e.g., VOD contents, live stream contents) of the virtual stream. For example, as described herein, the virtual video streaming module 442 may provide the appearance of a single virtual stream, by coordinating a continuous (and/or contiguous) streaming of VOD contents, so that there is a seamless transition between one content to another. In some embodiments, the virtual video streaming module 442 may generate a fade effect (e.g., fading in/out) between contents, to improve the presentation experience.

The channel guide module 444 may comprise code that causes the processor 446 to generate and provide a channel guide for presentation to a user device. In some embodiments, the channel guide may be similar to any of the channel guides described herein (e.g., channel guide 142 of FIG. 1, channel guide 207 of FIG. 2). In some embodiments, the channel guide may be utilizable by a user device for presenting a list of virtual channels. In some embodiments, the channel guide may also present other pertinent information for each virtual channel (e.g., contents currently streaming, a full line-up schedule for a given virtual channel, details about the content playing, a grouping of Favorite channels, etc.). In some embodiments, the presentation of the virtual channel on a GUI of the user device may enable the user device to receive input corresponding to a selection of a particular element of the channel guide (e.g., a virtual channel, a particular video content of a virtual channel, a channel settings button, etc.). The user device may then transmit a request to the virtual channel system 406 based on the received selection. In some embodiments, the channel guide may be updated to produce an updated channel guide. For example, as new video content is received by the system, the system may add new video contents to the schedule for a particular virtual channel. In another embodiment, any customizations applied (e.g., generating a new virtual channel, filtering content from an existing channel) may also cause an updated channel guide to be provided.

Figure 5:
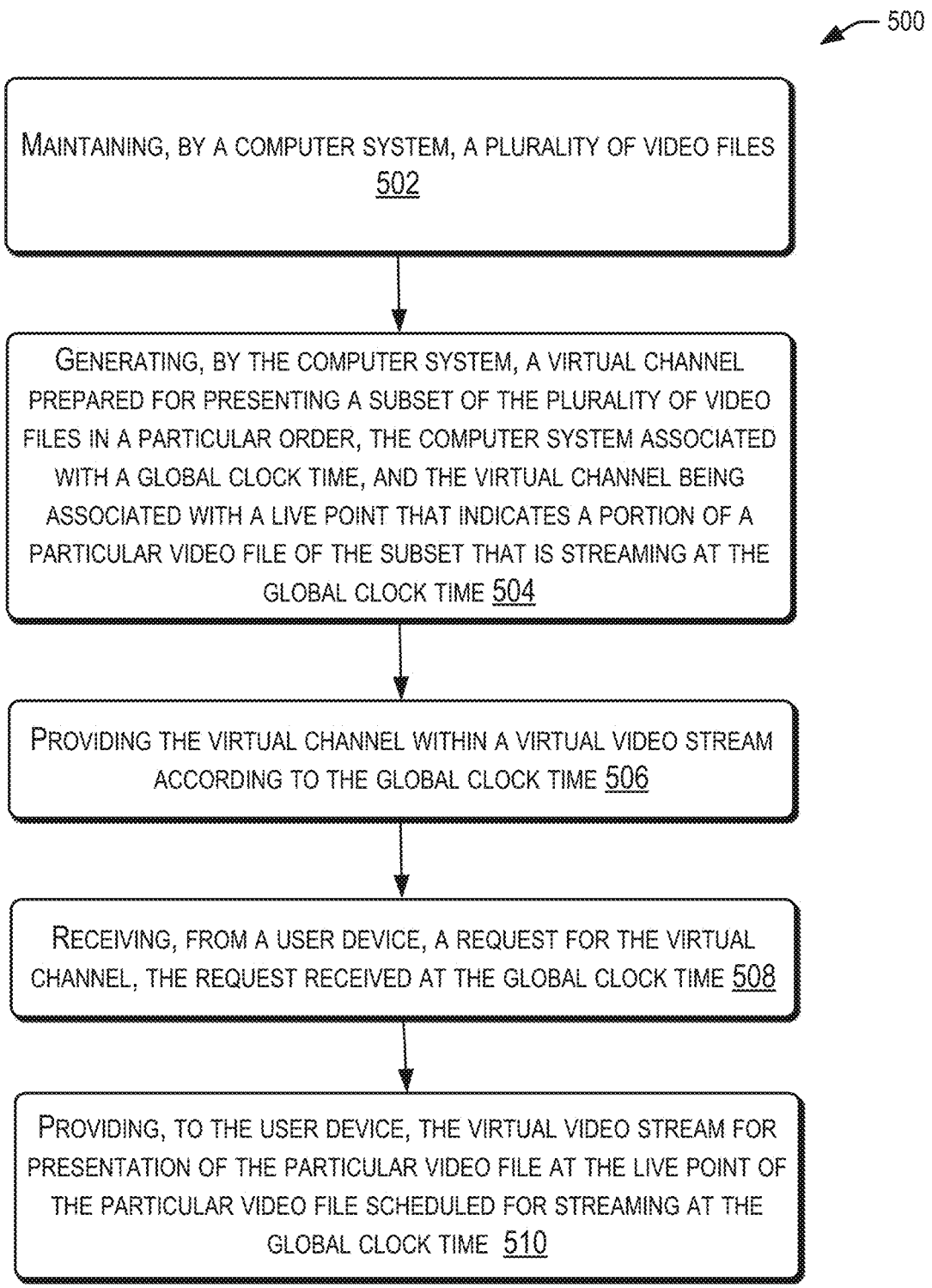
FIG. 5 is a simplified flow diagram illustrating an example process for providing a providing a virtual channel for presentation, according to some embodiments.

FIG. 5 is a simplified flow diagram illustrating an example process 500 for providing a providing a virtual channel for presentation on a user device, according to some embodiments. Process 500 and process 600 of FIG. 6 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some embodiments, process 500 may be performed by a virtual channel system, which may correspond to any one or more of the virtual channel systems described herein. At block 502, the virtual channel system may maintain a plurality of video files. In some embodiments, at least some of the plurality of video files may be available for VOD streaming. In some embodiments, the plurality of video files may be indexed by a video catalog. In some embodiments, each video content contained within the video file may be associated with one or more attributes (e.g., a category/genre, a rating, date produced, etc.).

At block 504, the virtual channel system may generate a virtual channel. The virtual channel may be prepared for presenting a subset of the plurality of video files in a particular order. In some embodiments, the subset (e.g., a second plurality of video files) may be selected based in part on each video content of the subset having a common attribute (e.g., a common category such as genre) and/or being correlated with each other in some way such that the selected subset represents a coherent grouping of content. In some embodiments, the virtual channel system may be associated with a global clock time (e.g., a standardized clock time), such as a particular time zone (e.g., Pacific Time Zone). It should be understood that the virtual channel system may be configured to receive requests from user devices located in different time zones. Accordingly, in some embodiments, multiple global clock times may be maintained by the virtual channel system, for example, per zone (or other suitable region). In some embodiments, the global clock time may correspond to a present time in a particular zone. In some embodiments, the virtual channel that is generated may be associated with a live point that indicates a portion of a particular video file of the subset (i.e., the second plurality of video files) that is streaming at the particular global clock time (e.g., for the particular zone).

At block 506, the virtual channel system may provide the virtual channel within a virtual video stream according to the global clock time. For example, in one embodiment, the system may execute a network service that is configured to listen for and receive requests from one or more user devices over a network. Meanwhile, the virtual video stream may be maintained at least in part by updating the live point (e.g., to an advanced live point) that is associated with the virtual video stream according to the global clock time. In some embodiments, there is only one live point for a default (non-customized) virtual channel at any given global clock time.

At block 508, the virtual channel system may receive, from a user device, a request for the virtual channel, whereby the request is received at the global clock time (e.g., 1:15 PM PT). In some embodiments, the system may first generate and provide a virtual channel guide to the user device, as described herein. The user device may present the channel guide, and then subsequently receive a selection of the virtual channel (e.g., among the list of the plurality of virtual channels presented in the virtual channel guide).

At block 510, the virtual channel system may provide the user device the virtual video stream for presentation of the particular video file at the live point of the particular video file scheduled for streaming at the global clock time. For example, continuing with the example above, a particular movie (included within the particular video file) of the virtual channel line-up may be scheduled for streaming between 1:00 PM PT and 3:00 PM PT. Accordingly, the system may provide the particular movie for streaming at the live point of the movie that is scheduled for streaming at the global clock time of 1:15 PM PT, when the request was received.

Figure 6:
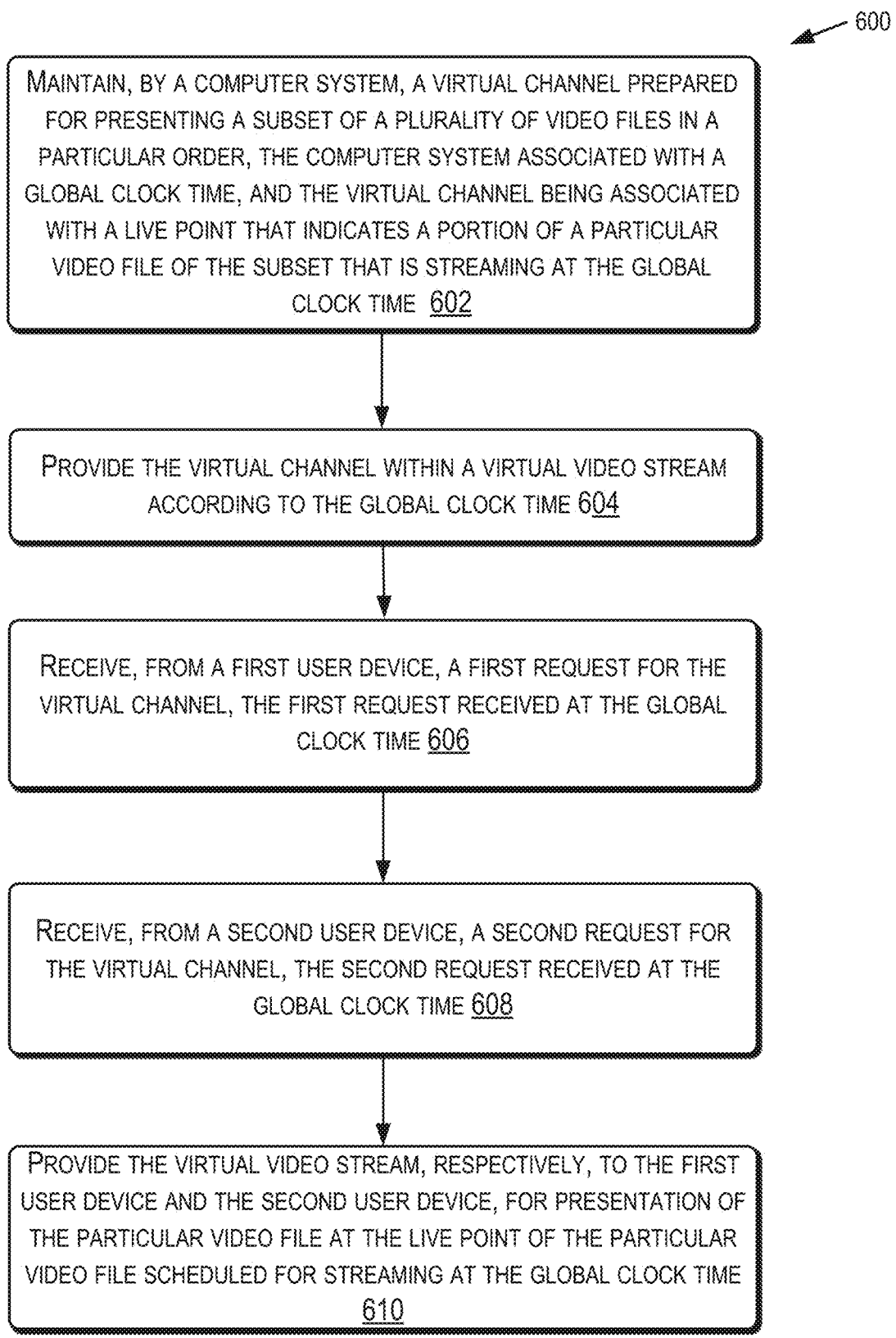
FIG. 6 is another simplified flow diagram illustrating an example process for providing a virtual channel for presentation, according to some embodiments.

FIG. 6 is another simplified flow diagram illustrating an example process 600 for providing a virtual channel for presentation, according to some embodiments. The process 600 illustrates a method for providing the same live point of a virtual channel on two different user devices, according to a global clock time. The process 600 may also be performed by a virtual channel system, which may correspond to any one or more of the virtual channel systems described herein.

At block 602, the virtual channel system may maintain a virtual channel. In some embodiments, the system may first generate the virtual channel, similar to as described above in reference to blocks 502 and 504 of process 500. In some embodiments, the virtual channel may be one of a plurality of virtual channels. The virtual channel may be prepared for presenting a subset of a plurality of video files in a particular order. The virtual channel system may be associated with a global clock time, and the virtual channel may be associated with a live point that indicates a portion of a particular video file of the subset that is streaming at the global clock time.

At block 604, the virtual channel system may provide the virtual channel within a virtual video stream according to the global clock time. In some embodiments, one or more of the operations of this block may be similar to as described in reference to block 506 of process 500.

At block 606, the virtual channel system may receive, from a first user device (e.g., user device 402 of FIG. 4), a first request for the virtual channel, the first request received at the global clock time (e.g., 1:15:00 PM PT). In some embodiments, one or more of the operations of this block may be similar to as described in reference to block 508 of process 500. In some embodiments, the global clock time may correspond to the present time in a particular zone (or associated with a particular group of users devices, including the first and second user device).

At block 608, the virtual channel system may receive, from a second user device (e.g., user device 404 of FIG. 4), a second request for the virtual channel, the second request received at the global clock time (e.g., 1:15:00 PM PT). In some embodiments, one or more of the operations of this block may also be similar to as described in reference to block 508 of process 500.

At block 610, the virtual channel system may provide the virtual video stream, respectively, to the first user device and the second user device, for presentation of the particular video file at the live point of the particular video file scheduled for streaming at the global clock time (e.g., 1:15:00 PM PT). It should be understood, then, that both the first user device and the second user device may present substantially the same video content that is scheduled for streaming at the global clock time. In at least this way, embodiments of the present disclosure may provide a similar experience as a stream-based video model (e.g., where multiple users may tune in to view the TV channel broadcast), while also enabling the benefits of VOD (e.g., since the underlying contents of the virtual channel may include VOD contents). In the example above, the first request and the second request were received at the same time, and subsequently the user devices display substantially the same video content. However, as described herein, embodiments may not be so limited. For example, consider another scenario where the global clock time may be 1:15:00 PM PT, when the first request is received. The first user device subsequently receives the video stream for the virtual channel at the live point. Later, the global clock time may advance to 1:20:00 PM PT, when the second request may be received (e.g., at the advanced global clock time), and then subsequently streamed for presentation of the virtual channel on the second user device at the updated live point. In this scenario, although the two requests were received at different times, both devices still are streaming at the same live point according to the advanced global clock time.

Figure 7:
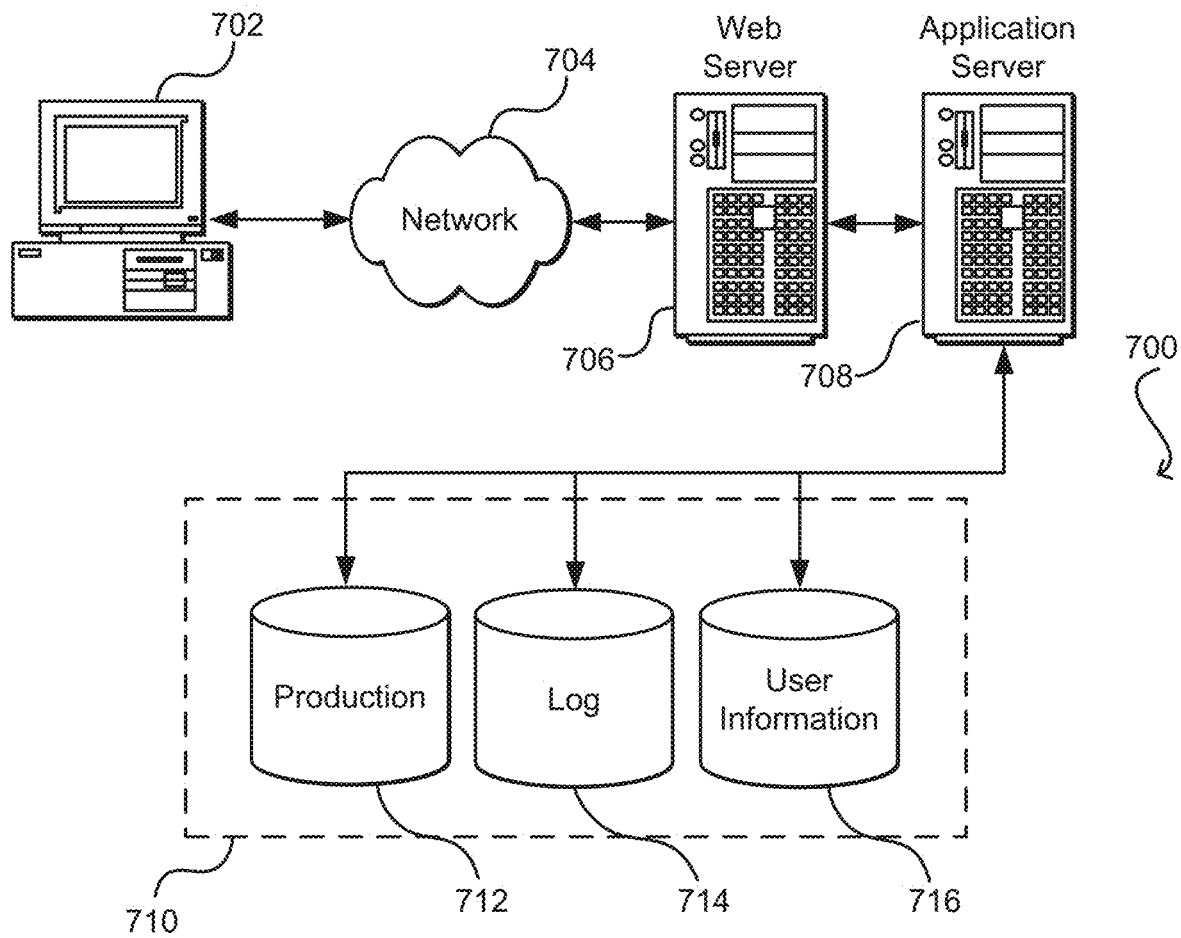
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the example environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
maintaining, by a processor, a first plurality of video files, at least some of the video files of the first plurality of video files being, respectively, available for video-on-demand (VOD) streaming;
selecting, by the processor, a second plurality of video files that corresponds to a subset of the first plurality of video files;
generating, by the processor, a virtual channel of a plurality of virtual channels, the virtual channel prepared for presenting the second plurality of video files in a particular order, the processor associated with a global clock time, and the virtual channel being associated with a live point that indicates a portion of a particular video file of the second plurality of video files that is streaming at the global clock time;
providing, by the processor, the virtual channel within a virtual video stream according to the global clock time;
providing, to a user device for presentation, a channel guide that indicates the particular order of video files scheduled for presentation for respective virtual channels of the plurality of virtual channels;
receiving, from the user device, a request for the virtual channel of the plurality of virtual channels, the request received at the global clock time;
providing, to the user device, the virtual video stream for presentation of the particular video file at the live point of the particular video file scheduled for streaming at the global clock time;
providing, by the processor to a second user device, the virtual video stream for presentation of the particular video file at the live point of the particular video file scheduled for streaming at the global clock time, the second user device having requested the virtual video stream at the global clock time;
receiving, from the user device at a second global clock time, a second request to skip to a first point in the virtual video stream;
receiving, from the second user device at the second global clock time, a third request to skip to a second point in the virtual video stream that is different from the first point; and
providing, by the processor, the virtual video stream for presentation to the user device at the first point and the second user device at the second point.

2. The computer-implemented method of claim 1, further comprising:
receiving, from the user device at a third global clock time, a fourth request to synchronize the presentation of the virtual video stream back to a second live point that is scheduled for streaming at the third global clock time; and
providing, by the processor to the user device, the virtual video stream for presentation of the video file at the second live point.

3. The computer-implemented method of claim 1, wherein the global clock time corresponds to a standardized clock time of a time zone, the global clock time being associated with the user device and at least another user device.

4. The computer-implemented method of claim 1, further comprising:
receiving, by the processor, a request for a second particular video file that is scheduled for streaming at a later time than the global clock time, the second particular video file being available for video-on-demand streaming and being one of the video files of the virtual channel that is presented within the channel guide; and
providing, by the processor to the user device, a video-on-demand stream of the second particular video file for presentation on the user device.

5. A computing device, comprising:
a memory comprising computer-executable instructions; and
one or more processors in communication with the memory and configured to access the memory and execute the computer-executable instructions to perform, at least:
maintaining a plurality of video files;
generating a virtual channel, the virtual channel prepared for presenting a subset of the plurality of video files in a particular order, the computing device associated with a global clock time, and the virtual channel being associated with a live point that indicates a portion of a particular video file of the subset that is streaming at the global clock time;
providing the virtual channel within a virtual video stream according to the global clock time;
receiving, from a user device, a request for the virtual channel, the request received at the global clock time;
providing, to the user device, the virtual video stream for presentation of the particular video file at the live point of the particular video file scheduled for streaming at the global clock time;
providing, to a second user device, the virtual video stream for presentation of the particular video file at the live point of the particular video file scheduled for streaming at the global clock time, the second user device having requested the virtual video stream at the global clock time;
receiving, from the user device at a second global clock time, a second request to skip to a first point in the virtual video stream;
receiving, from the second user device at the second global clock time, a third request to skip to a second point in the virtual video stream that is different from the first point; and
providing the virtual video stream for presentation to the user device at the first point and the second user device at the second point.

6. The computing device of claim 5, wherein the first point corresponds to a forward skip from a present live point of the virtual video stream at the second global clock time, and wherein the second point corresponds to a backward skip from the present live point.

7. The computing device of claim 5, wherein the subset of the plurality of video files are selected based at least in part on being associated with a common attribute.

8. The computing device of claim 5, wherein the virtual channel is one of a plurality of virtual channels generated, the virtual channel distinguished among the plurality of virtual channels based at least in part on at least one of: (1) a composition of the subset of the plurality of video files being different from compositions of other subsets of the plurality of video files for respective virtual channels, or (2) the particular order of presentation of the subset of the plurality of video files being different from other subsets of the plurality of video files for respective virtual channels.

9. The computing device of claim 8, wherein the memory comprises further computer-executable instructions that, when executed by the one or more processors, further cause the computing device to perform, at least:
providing, to the user device for presentation, a channel guide that indicates the particular order of video files scheduled for presentation for respective virtual channels of the plurality of virtual channels; and
receiving, from the user device, a request for the virtual channel of the plurality of virtual channels, the request received based at least in part on a selection of the virtual channel among the plurality of virtual channels indicated by the channel guide.

10. The computing device of claim 8, wherein the memory comprises further computer-executable instructions that, when executed by the one or more processors, further cause the computing device to perform, at least:
receiving, from a second user device, a second request for the virtual channel, the second request received at a second global clock time; and
providing, to the second user device, the virtual video stream for presentation of the particular video file at a second live point of the particular video file scheduled for streaming at the second global clock time.

11. The computing device of claim 10, wherein the second global clock time corresponds to an advanced global clock time that is subsequent to the global clock time, and the second live point corresponds to an advanced live point of the particular video file that is associated with the second global clock time.

12. The computing device of claim 11, wherein the memory comprises further computer-executable instructions that, when executed by the one or more processors, further cause the computing device to perform, at least:
providing, to the user device, the virtual video stream for presentation of the particular video file at the second live point of the particular video file scheduled for streaming at the second global clock time, wherein a second portion of the particular video file associated with the second live point is operable for being presented on both the user device and the second user device at the second global clock time.

13. The computing device of claim 10, wherein the second global clock time is substantially the same as the global clock time, and the second live point is substantially the same as the live point.

14. The computing device of claim 5, wherein the memory comprises further computer-executable instructions that, when executed by the one or more processors, further cause the computing device to perform, at least:
receiving, from the user device, a second request to skip forward to a second video file scheduled for presentation, the second video file being available for video-on-demand (VOD) streaming;
providing to the user device the second video file for streaming within the virtual video stream based at least in part on the second request.

15. The computing device of claim 14, wherein upon a completion of the streaming of the second video file, a third video file is subsequently automatically provided for streaming within the virtual video stream, the third video file being scheduled for streaming immediately subsequent to the second video file in the particular order.

16. One or more non-transitory computer-readable storage media comprising computer-executable instructions that, when executed by one or more processors, cause the one or more processors to perform, at least:
maintaining a virtual channel prepared for presenting a plurality of video files in a particular order, the plurality of video files being a subset of a second plurality of video files, the one or more processors associated with a global clock time, and the virtual channel being associated with a live point that indicates a portion of a particular video file of the subset that is streaming at the global clock time;
providing the virtual channel within a virtual video stream according to the global clock time;
receiving, from a user device, a request for the virtual channel, the request received at the global clock time;
providing, to the user device, the virtual video stream for presentation of the particular video file at the live point of the particular video file scheduled for streaming at the global clock time;
providing, to a second user device, the virtual video stream for presentation of the particular video file at the live point of the particular video file scheduled for streaming at the global clock time, the second user device having requested the virtual video stream at the global clock time;
receiving, from the user device at a second global clock time, a second request to skip to a first point in the virtual video stream;
receiving, from the second user device at the second global clock time, a third request to skip to a second point in the virtual video stream that is different from the first point; and
providing the virtual video stream for presentation to the user device at the first point and the second user device at the second point.

17. The one or more non-transitory computer-readable storage media of claim 16, wherein at least one of the video files of the subset corresponds to an interstitial video content, the interstitial video content being scheduled adjacent to at least one other video file in the particular order of video files based at least in part on a predetermined cadence.

18. The one or more non-transitory computer-readable storage media of claim 16, wherein the instructions further comprise:
providing, to the user device for presentation, a channel guide that indicates the particular order of video files scheduled for presentation for the virtual channel, the virtual channel being one of a plurality of virtual channels indicated by the channel guide as being available for selection.

19. The one or more non-transitory computer-readable storage media of claim 18, wherein the instructions further comprise:
receiving, from the user device, an input to filter out a particular type of video content from being scheduled for presentation within the virtual channel; and
providing, to the user device for presentation, an updated channel guide, whereby the particular type of content is filtered from being listed within the updated channel guide.

20. The one or more non-transitory computer-readable storage media of claim 18, wherein the instructions further comprise:
receiving, from the user device, a channel seed as input that corresponds to a particular type of video content of interest; and
generating a new virtual channel, the new virtual channel prepared for presenting a second subset of the second plurality of video files, the second subset being selected based at least in part on the channel seed; and providing, to the user device for presentation, an updated channel guide that includes the new virtual channel.

\* \* \* \* \*